United States Patent [19]
Markovitz et al.

[11] Patent Number: 6,043,582
[45] Date of Patent: Mar. 28, 2000

[54] STABLE CONDUCTIVE MATERIAL FOR HIGH VOLTAGE ARMATURE BARS

[75] Inventors: Mark Markovitz, Schenectady; James Jonathan Grant, Niskayuna; Jeffrey David Sheaffer; William Edward Tomak, both of Scotia, all of N.Y.

[73] Assignee: General Electric Co., Schenectady, N.Y.

[21] Appl. No.: 09/136,381

[22] Filed: Aug. 19, 1998

[51] Int. Cl.[7] .................................. H02K 3/30; H02B 1/02
[52] U.S. Cl. ........................ 310/213; 310/215; 310/45; 310/196; 310/201; 174/15 C
[58] Field of Search .................... 174/15 C; 310/215, 310/42, 213, 43, 44, 45, 208, 201, 196

[56] References Cited

U.S. PATENT DOCUMENTS

| | | | |
|---|---|---|---|
| 3,563,850 | 2/1971 | Stackhouse et al. | 161/184 |
| 3,856,979 | 12/1974 | Schmid | 174/15 C |
| 4,020,017 | 4/1977 | Smith et al. | 174/120 SR |
| 4,112,193 | 9/1978 | Higuchi et al. | 174/122 C |
| 5,723,920 | 3/1998 | Markovitz et al. | 310/42 |

FOREIGN PATENT DOCUMENTS

| | | | |
|---|---|---|---|
| 982600 | 2/1965 | United Kingdom | C03C 3/22 |
| 1106226 | 3/1968 | United Kingdom | C03C 3/22 |
| 1132856 | 6/1968 | United Kingdom | C03C 3/22 |
| 1112765 | 8/1968 | United Kingdom | C03C 9/00 |
| 1334164 | 10/1973 | United Kingdom | H01B 17/42 |

OTHER PUBLICATIONS

U.S. application No. 08/770,037, Markovitz et al., filed Dec. 19, 1996.

*Primary Examiner*—Nestor Ramirez
*Assistant Examiner*—Burton Mullins
*Attorney, Agent, or Firm*—Domenica Hartman; Robert C. Lampe, Jr.

[57] ABSTRACT

A high voltage generator armature bar (10) that exhibits improved performance by forming one or more of its conductive components from a conductive material that uses a tin oxide-based composition as a conductive filler. The armature bar (10) is of the type having one or more tiers of conductor strands (12), strand insulation (14), conductive internal grading (20), groundwall insulation (22), conductive slot armoring (24), and preferably a transposition filler (18). The conductive internal grading (20), the conductive slot armoring (24) and/or the transposition filler (18) contain a conductive filler of antimony-doped tin oxide that may constitute the entire conductive filler, or can be present as a shell on the filler particles.

20 Claims, 1 Drawing Sheet

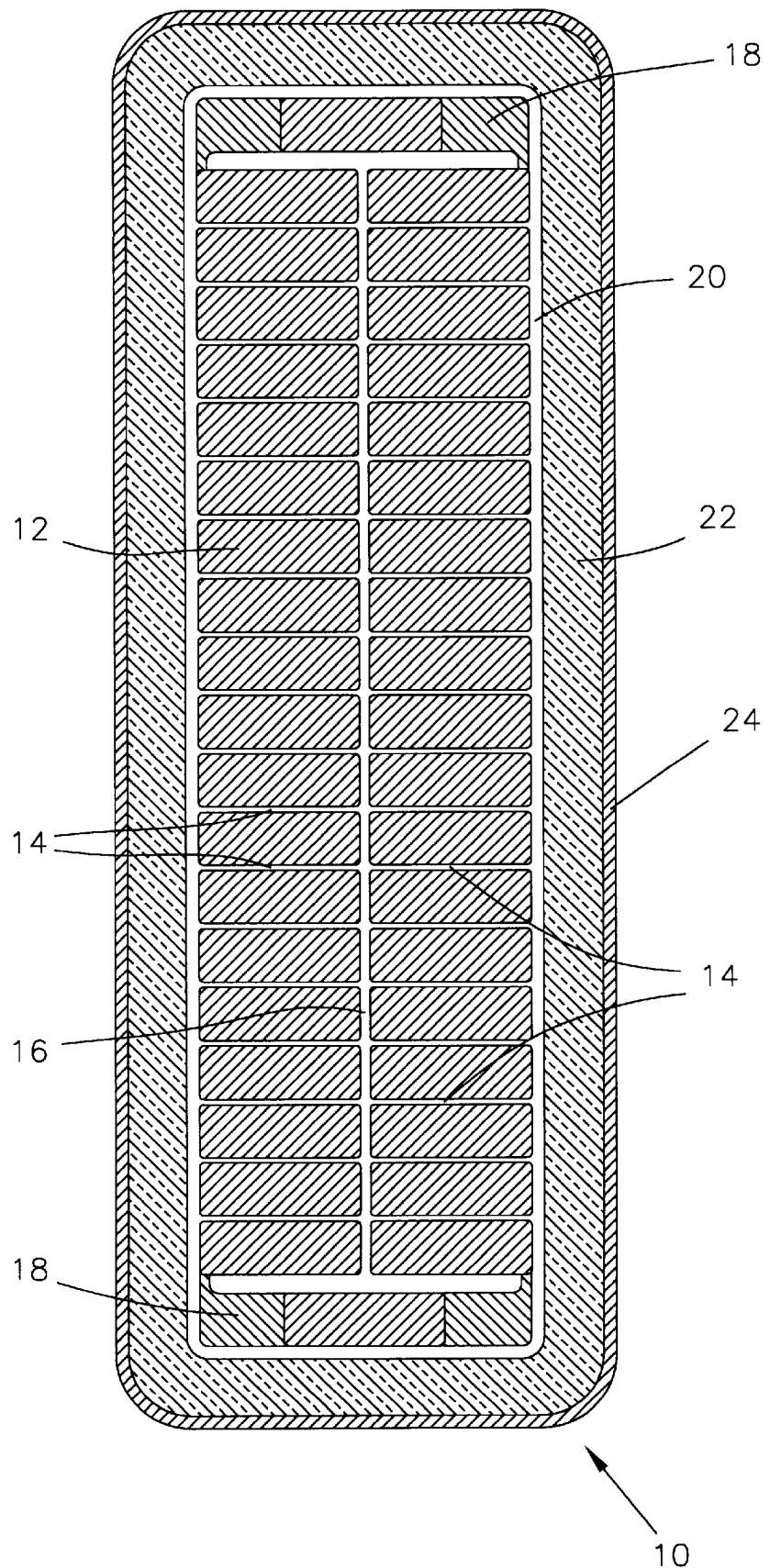

STABLE CONDUCTIVE MATERIAL FOR HIGH VOLTAGE ARMATURE BARS

FIELD OF THE INVENTION

This invention generally relates to conductive materials used in high voltage armature bars. More particularly, this invention is directed to conductive materials that exhibit more controllable electrical conductivity as a result of using a tin oxide-based conductive filler. Use of a tin oxide-based conductive filler also improves the stability of such materials when subjected to high voltage exposure.

BACKGROUND OF THE INVENTION

Carbon-filled materials have been widely used to form electrically-conductive members of various electrical equipment and components, including high voltage armature (stator) bars of generators. As known in the art, armature bars are composed of a number of conducting copper strands that are insulated from each other by strand insulation. The strands are typically arranged to form two tiers or columns that are separated by an insulating strand separator, which together may be termed the "bare bar." Surrounding the tiers is a groundwall insulation typically formed by multiple wrappings of a mica paper tape. As used herein, "high voltage" refers to an armature or stator bar subjected to voltages of 6 kV and higher.

As many as three different conductive materials are typically present in a high voltage armature bar. On the outside surface of the groundwall insulation in the slot section, a coating of conductive paint or a conductive tape is used as conductive slot armoring to protect the groundwall insulation from erosion by electrical discharges. Another method of forming protective conductive slot armoring is to apply a conductive adhesive on the groundwall insulation, wrap a woven fabric tape over the adhesive to bond the tape to the groundwall insulation, and then coat the tape with a conductive paint. The surface resistance of the slot armoring is usually desired to be about 500 to 100,000 ohms/square in order to suitably protect the groundwall insulation from electrical discharges. For this purpose, the conductive paints and tapes of slot armorings have contained carbon dispersed as a filler in a polymeric or resinous binder. However, after long term use and exposure to high voltage and thermal stresses, sections of the tape and paint can deteriorate. This is visible as white spots due to the decomposition and volatilization of the carbon and binder as gaseous decomposition products.

Another conductive material used within high voltage armature bars is referred to as conductive internal grading, which may be in the form of a coating of paint or a tape applied over the bare bar prior to application of the groundwall insulation. Internal grading paints are usually applied to the top and bottom edges and corners of the bare bar, extending about three to twenty-five millimeters on the sides of the bar. Internal grading tapes are typically a porous fabric support sheet that carries a conductive polymeric coating of carbon particles dispersed in a polymeric matrix, as described in U.S. Pat. No. 5,723,920, assigned to the assignee of the present invention. Internal grading is used to achieve an equipotential voltage plane, eliminating voltage stress risers that cause reduced dissipation factor tip-ups, which is the difference in dissipation factor at different stress levels. Internal grading can also improve the short time breakdown strength of the insulation, as discussed in the U.S. Pat. No. 5,723,920. However, carbon-based internal grading paints and tapes are susceptible to deterioration around the high stress corners of the bar and on the top and bottom edges of the bar. The deterioration is visible by the absence of the carbon after long term exposure to high voltages under accelerated test conditions, in which applied voltages are much higher than normal operating voltages.

The third type of conductive material sometimes present in high voltage armature bars is referred to as a transposition filler, which is typically formed by a compound that is molded on the top and bottom edges of the bare bar. The molding compound is usually a catalyzed epoxy resin that fills the voids between the copper strands at the crossovers, providing smooth surfaces at the top and bottom of the bar after molding. As an alternative to conductive internal grading tapes and paints, the molding compound can be made conductive by dispersing carbon particles in the resin. Conductive molding compounds of the type used for transposition fillers are also sometimes used as a component of the internal grading system.

As indicated above, in the past conductive paints, adhesives, tapes and molding compounds used in high voltage armature bars have typically contained carbon as the conductive filler, which is dispersed in a polymeric matrix. The carbon is present as a conductive carbon powder or powdered graphite, which renders the material black. The conductive paints, adhesives and tapes used as conductive slot armoring for groundwall insulation and the conductive paints and tapes used for internal grading at the interface between the groundwall insulation and the bare bar have given excellent performance. Conductive 15 molding compounds on the top and bottom edges of the bare bar have also performed well. Nonetheless, further improvements in the manufacturability and performance of these conductive materials would be desirable. For example, the manufacture of conductive paints, adhesives and tapes containing carbon as a filler is made difficult because of the large changes in surface resistivity with small changes in carbon content. As indicated above, the surface electrical resistance of conductive paints and tapes used to form the protective slot armorings and internal grading must be within a certain range, usually from about 500 to 100,000 ohms/square. When carbon is used as the filler to impart conductivity, the surface resistance can fall below or rise above the desired range as a result of a small excess or deficiency of the carbon content, respectively. Changes in processing conditions can also significantly alter the surface resistance of these materials. Consequently, caution is required in formulating and manufacturing carbon containing conductive materials for armature bars because of the strong sensitivity of the surface resistivity to the carbon content.

In addition it is believed that, under high voltage conditions, the carbon particles decompose by oxidation to carbon monoxide and carbon dioxide, causing the black color of the carbon to disappear and producing white areas in the material. It is possible that under high voltages, oxygen in the air forms ozone that acts as an oxidizer of the carbon. Decomposition of carbon in the slot armoring, internal grading and transposition filler of an armature bar lowers their conductivity and therefore negatively affects their performance.

In view of the above, it would be desirable if improved paints, adhesives and tapes were available for use as conductive materials for high voltage armature bars, and particularly materials that exhibit improved resistance to erosion by electrical discharges, improved resistance to oxidative decomposition, and less sensitivity to surface resistance.

SUMMARY OF THE INVENTION

According to this invention, the performance of a high voltage generator armature bar is improved by forming one or more of its conductive components from a conductive material that uses a tin oxide-based composition as a conductive filler. More particularly, this invention finds use in high voltage armature bars of the type having one or more tiers or columns of conductor strands, strand insulation surrounding each of the conductor strands, conductive internal grading on and possibly surrounding the tier of conductor strands, groundwall insulation surrounding the conductive internal grading, and a conductive material surrounding the groundwall insulation. Such armature bars also generally include a transposition filler formed by a molding compound at the opposite ends of the copper strand tiers. This molding compound may also be formed of a conductive material. According to the invention, the conductive internal grading, the conductive material and/or the molding compound comprise a conductive filler of tin oxide, and more preferably an antimony-doped tin oxide that preferably contains 5 to 15 weight percent antimony. Tin oxide can constitute the entire conductive filler, which is preferably in particulate form, or can be present as a coating or shell on the filler particles. In the latter embodiment, mica, titanium oxide or silica can serve as the core material for the filler particles, with mica being generally preferred for its mechanical properties.

According to this invention, a conductive filler based on tin oxide is not susceptible to oxidative decomposition, thereby enhancing the performance of conductive materials used in high voltage armature bars.

By replacing carbon filler, which is also susceptible to erosion by electrical discharges, with conductive powdered fillers based on tin oxide, the performance and long term reliability of conductive paints, adhesives, tapes and molding compounds used in armature bars are improved. Surprisingly, the use of tin oxide fillers has been determined to greatly reduce the sensitivity of surface resistivity to filler content, particularly in the resistivity ranges of interest to the conductive materials for high voltage armature bars. As a result, the present invention greatly eases the production of conductive paints, adhesives and tapes used in the manufacture of high voltage armature bars. Finally, because tin oxide-filled conductive materials are light colored and not black as are carbon-filled conductive materials of the prior art, the present invention permits color coding of conductive materials for different applications. For example, different conductive tapes can be color coded for use as either internal grading or conductive slot armoring.

Other objects and advantages of this invention will be better appreciated from the following detailed description.

BRIEF DESCRIPTION OF THE DRAWINGS

The present invention will now be described, by way of example, with reference to the accompanying drawings, in which the lone FIGURE shows in cross-section a high voltage armature bar in accordance with a preferred embodiment of this invention.

DETAILED DESCRIPTION OF THE INVENTION

The present invention provides conductive materials whose electrical and physical properties make them particularly well suited for use as materials for the conductive components of high voltage generator armature bars. The FIGURE depicts a high voltage armature bar 10 for a generator and having the general appearance of armature bars known in the prior art. As with prior art armature bars, the armature bar 10 of this invention is composed of a number of conducting copper strands 12 that are insulated from each other by strand insulation 14 formed by an enamel or a varnish-coated fiber wrapping. As shown, the strands 12 are arranged to form two tiers that are separated by a strand separator 16. The strands 12 and strand insulation 14 are solidified in a hot press by curing the resin in the strand separator 16, and also curing a molding compound on the top and bottom of the bar to form what is termed a transposition filler 18. Together, the strands 12, insulation 14, separator 16 and transposition filler 18 form what is termed the conductor package or "bare bar." As known in the art, the transposition filler 18 can be rendered conductive by adding a conductive filler to the molding compound. A conductive internal grading 20 formed by tape is shown as enveloping the bare bar, over which a groundwall insulation 22 is formed in any suitable manner.

If a tape, the internal grading 20 can be formed by a porous fabric support sheet carrying a conductive polymeric binder containing conductive particles dispersed in a polymeric binder, as described in U.S. Pat. No. 5,723,920, assigned to the assignee of this invention. Alternatively, the internal grading 20 can be formed by a conductive paint that includes conductive particles dispersed in a polymeric material, such as a solution of an epoxy resin in a solvent. The paint can be applied on the top and bottom edges and around the corners of the bare bar, extending to approximately ⅛ to 1 inch (about 3 to about 25 mm) on each side of the bare bar.

The groundwall insulation 22 is generally a hard, nonporous surface formed by multiple wrappings of a mica paper tape, such as those described in U.S. Pat. No. 3,563,850 to Stackhouse et al. and U.S. patent application Ser. No. 08/770,037, each of which are assigned to the assignee of this invention. As shown in the Figure, the groundwall insulation 22 is covered with a conductive slot armoring 24, which can be in the form of a conductive tape wrapped around and over the groundwall insulation 22. Alternatively, the slot armoring 24 can be formed by applying a conductive adhesive on the groundwall insulation 22, wrapping a porous woven fabric tape over the adhesive to bond the fabric tape to the groundwall insulation 22, and then coating the tape with a conductive paint. Yet another alternative is to form the slot armoring 24 with only conductive paint comprising conductive particles dispersed in a polymeric binder, such as an epoxy or alkyd paint.

As discussed above, various forms of carbon have previously been used as the conductive particles in the conductive slot armoring 24, internal grading 20 and transposition filler 18. However, the addition of carbon fillers, even in small increments, can have a dramatic effect on the electrical resistance of the conductive paints, adhesives, tapes and compounds that form the conductive components of an armature bar 10. Furthermore, carbon fillers within high voltage armature bars are susceptible to degradation by oxidation and electrical discharge. In contrast, this invention employs a conductive filler based on tin oxide to produce the conductive tapes, adhesives, paints and molding compounds that form the slot armoring 24, internal grading 20 and transposition filler 18. According to this invention, conductive materials formed to include tin oxide as the conductive filler are easier to manufacture, exhibit electrical resistances that are easier to control in that their resistances are less sensitive to conductive filler content regardless of the type of surface (e.g., porous or hard and nonporous), and are more stable when subjected to long term exposure to high voltages. In addition, the tin oxide fillers of this invention are light colored instead of black as are the carbon-filled conductive materials of the prior art. As a result, conductive paints, adhesives, tapes and compounds containing the tin oxide fillers of this invention can be color coded to identify their use for different applications, such as one color for identifying tapes for the internal grading 20 and another color for tapes used to form the slot armoring 24.

The conductive fillers of this invention can be antimony-doped tin oxide, or an antimony-doped tin oxide shell over a core of mica, titanium oxide or silica. The antimony content of the antimony-doped tin oxide is generally about five to about fifteen weight percent, with the balance being tin oxide. Fillers formed entirely of antimony-doped tin oxide preferably have a particle size of about 0.1 to about 1.0 µm, while fillers having antimony-doped tin oxide as a shell material have a preferred particle size of about 1 to about 10 µm. Suitable conductive fillers formed entirely of antimony-doped tin oxide include ZELEC 3010-XC and 3005-XC, each of which are commercially available from E.I. DuPont de Nemours and Company, Inc. These fillers have an average particle size of about 0.7 micrometer and a bulk dry powder resistivity of about 0.5 to 5 ohms/cm, though differing in color and other properties. A suitable conductive filler having a mica core with an antimony-doped tin oxide shell is commercially available under the name ZELEC ECP 1410-M from DuPont. This filler has an average particle size of about 9 micrometers and a bulk dry powder resistivity of about 2 to 20 ohms/cm. Mica is generally preferred as the core material based on its "shingling" effect—how the particles arrange themselves in a coating—and for its toughening effect on the conductive polymeric material.

Suitable examples of antimony-doped tin oxide fillers whose cores are titanium oxide include ZELEC ECP 1410-T and ZELEC ECP 3410-T, each of which are also available from DuPont. 1410-T has an average particle size of about 5 micrometers and a bulk dry powder resistivity of about 1 to 5 ohms/cm. 3410-T has an average particle size of about 0.5 micrometer and a bulk dry powder resistivity of about 1 to 5 ohms/cm. Suitable conductive fillers having a hollow silica shell as the core material and a conductive outer shell of antimony-doped tin oxide include ZELEC ECP 1610-S, 2610-S, 3610-S, 1703-S and 2703-S, which range in average particle size from about 3 to 9 micrometers and bulk dry powder resistivities from a low of about 2 to 25 ohms/cm to a high of about 20 to 80 ohms/cm.

The polymeric materials used in this invention include various epoxy resins and high molecular weight (at least 15,000 weight average molecular weight) linear copolymers of epichlorohydrin and bisphenol A, such as EPOTUF 38-525 available from Reichhold Chemical, Inc., EPONOL Resins 53 and 55 available from the Shell Chemical Co., and GZ 488 resins available from the Ciba Co. In place of a linear copolymer of epichlorohydrin and bisphenol A, other polymeric and resinous materials can be used, such as unsaturated polyester, alkyd, bismaleimide, polyimide, silicone and cyanate ester resins.

During the course of investigations leading to this invention, various conductive paint, tape and molding compound compositions were formulated and evaluated. Examples 1 and 2 compare prior art carbon-filled paints and paints containing a tin oxide filler according to this invention when applied to a hard, non-porous surface (such as a cured groundwall insulation), while Examples 3 and 4 compare paints according to the prior art and this invention when applied to a porous woven fabric that has been bonded to a hard surface. Example 5 is an example of a conductive epoxy adhesive containing a tin oxide-based filler. Finally, as will be discussed in greater detail below, Examples 6 and 7 compare woven fabric tapes containing either graphite particles or tin oxide-coated mica particles, Examples 8 and 9 compare the voltage endurance life of armature bars internally graded with woven glass fabric tapes containing carbon particles or tin oxide-coated mica particles, and Example 10 evaluates a molding compound containing a tin oxide-coated conductive filler of this invention.

EXAMPLE 1 (COMPARISON)

A conductive paint was prepared with an epoxy paint made from a bisphenol A-diglycidyl epoxy resin (epoxide equivalent weight of 600 to 700) and a modified aliphatic amine hardener. The epoxy paint was rendered conductive by the addition of a mixture of graphite powders to yield a carbon content of about 40.0% by weight based on total solids. The graphite powder mixture was a 1:1 ratio of powders available under the names APR-SF and #057 from Asbury Graphite Mills and Dixon Ticonderoga Co., respectively. After brushing and drying the paint on a hard, nonporous surface, the surface resistance of the paint was about 130,000 ohms/square. The paint was then modified to have a total 41.0% carbon content with the addition of 1.0% by weight (based on total solids) of conductive carbon powder VULCAN XC-72R (available from Cabot Corp.). After applying and drying the modified paint on the same hard, nonporous surface used previously, the surface resistance dropped to about 20,000 ohms/square, i.e., the modified paint produced a coating that was about 6.5 times more conductive than the paint containing 40.0% carbon. The addition of 2.0 percent by weight (based on total solids) of VULCAN XC-72R to the original paint (yielding a total 42.0% carbon content in the paint) caused the surface resistance to drop to as low as 6,000 ohms/square, i.e., about 22 times more conductive than the original paint.

EXAMPLE 2 (INVENTION)

ZELEC ECP 1410-M (mica core coated with antimony-doped tin oxide) was combined with the same epoxy paint used in Example 1 to yield a conductive paint containing about 40.0% by weight (based on total solids) conductive filler. The resulting conductive paint was brushed on the same nonporous, hard surface used in Example 1. The surface resistance after drying was about 30,000 ohms/square. When the ZELEC ECP 1410-M content in the conductive paint was increased to 45.0% by weight (based on total solids), the surface resistance decreased to about 18,000 ohms/square, or only about 1.7 times more conductive than the original conductive paint containing 40% filler. Further increasing the ZELEC ECP 1410-M content to 50.0 percent by weight (based on total solids) decreased the surface resistance to about 11,000 ohms/square, or about 2.7 times more conductive than the original conductive paint. These results evidenced that a conductive paint containing antimony-doped tin oxide as the conductive filler is substantially less sensitive to filler content than the prior art paint containing carbon as the conductive filler from Example 1.

EXAMPLE 3 (COMPARISON)

A conductive paint was prepared from an epoxy novolac having an epoxide equivalent weight of 176 to 181 and a modified amine hardener. The paint was rendered conductive by the addition of APR-SF and #057 graphite powders in a 1:1 weight ratio to yield a 22.5% by weight (based on total solids) conductive filler content. The conductive paint was brushed on a woven glass tape that was epoxy bonded to a hard, nonporous surface. The surface resistance after drying was about 125,000 ohms/square. Increasing the content of the graphite powders to about 25.0% by weight (based on total solids) decreased the surface resistance to about 20,000 ohms/square, i.e., about 6.3 times more conductive than the paint having a 22.5% graphite content.

EXAMPLE 4 (INVENTION)

A conductive paint was prepared by combining the same epoxy novolac paint of Example 3 with the ZELEC ECP 1410-M tin oxide-based conductive filler to yield a filler content of about 40.0% by weight (based on total solids).

This conductive paint was applied to the same woven glass tape material used in Example 3. The surface resistance after drying was about 35,000 ohms/square. Increasing the ZELEC ECP 1410-M content to about 45.0% by weight (based on total solids) decreased the surface resistance to about 26,000 ohms/square, or 1.3 times more conductive than the paint with the 40% filler content. Further increasing the ZELEC ECP 1410-M content to 50.0% by weight (based on total solids) decreased the surface resistance to about 19,000 ohms/square, or 1.8 times more conductive than the original paint. These results again evidenced that a conductive paint containing antimony-doped tin oxide as the conductive filler is substantially less sensitive to filler content than prior art paints containing carbon as the conductive filler (Example 3).

EXAMPLE 5 (INVENTION)

A two-part epoxy adhesive was made by combining about 70.6 parts-by-weight of an epoxy novolac available under the name DEN 438-EK85 from the Dow Chemical Co., about 40.0 parts-by-weight of a bisphenol A diglycidyl ether epoxy resin available under the name EPON 828 from the Shell Chemical Co., about 79.0 parts-by-weight of methyl ethyl ketone, and about 94.1 parts-by-weight of the ZELEC ECP 1410-M conductive filler. The adhesive was catalyzed with 15.0 parts-by-weight of triethylene tetramine. After curing, the adhesive, containing about 45.0% by weight (based on total solids) ZELEC ECP 1410-M (antimony-doped tin oxide-coated mica particles), had a surface resistance of about 20,000 ohms/square. Increasing the filler content of the adhesive to about 50.0% yielded a reduced surface resistance of about 16,000 ohms/square. Again, these results evidenced that antimony-doped tin oxide as a conductive filler yields a conductive composition, here an adhesive, that is relatively insensitive to filler content.

From the above results, it was concluded that a suitable range for the conductive filler content of paints and adhesives used to form the conductive internal grading layer and slot armoring of a high voltage armature bar is about 20% to about 60% by weight of total solids.

In Examples 6 and 7, a woven fabric was pretreated with a dispersion of conductive particles in a solution of a polymeric or resinous material to manufacture conductive internal grading tapes and conductive slot tapes. It was found that the surface resistances of these materials were less sensitive to conductive filler content when the filler was a tin oxide-based filler according to this invention (Example 7) than when carbon was used as in the prior art (Example 6). The reduced sensitivity to conductive filler content facilitates the manufacture of conductive slot and internal grading tapes.

EXAMPLE 6 (COMPARISON)

A conductive tape was prepared from a woven glass fabric that was treated with an epoxy resin containing 18.0% by weight (based on total solids) of a graphite powder available under the name T10 from Lonza Inc. The resulting tape had a surface resistance of about 170,000 ohms/square. Preparing a second conductive tape to have an increased graphite content of about 22.0% by weight (based on total solids) decreased the surface resistance to about 8,000 ohms/square, or 21 times more conductive than the original tape.

EXAMPLE 7 (INVENTION)

Woven glass fabric of the same type used in Example 6 was treated with a dispersion containing about 37.5% by weight (based on total solids) of ZELEC ECP 1410-M in a solution of a high molecular weight linear copolymer of epichlorohydrin and bisphenol A. The resulting conductive tape had a surface resistance of about 30,000 ohms/square. When a second tape was prepared with the ZELEC ECP 1410-M content increased to 45.0% by weight (based on total solids), the surface resistance was decreased to about 25,000 ohms/square, or 1.2 times more conductive than the first tape.

From the above results, it was concluded that a suitable range for the conductive filler content of tapes used to form the conductive internal grading and slot armoring of a high voltage armature bar is about 20% to about 60% by weight of total solids.

EXAMPLE 8 (BASELINE)

More than 80 bars were tested at voltage stress levels of 185 to 400 kV per inch in order to determine voltage endurance life as a function of voltage stress.

These bars were internally graded with a tape made from a woven glass fabric (style #1610 having a plain weave, fabric thickness of about 0.0043 inch (about 0.11 mm), and a weight of about 2.40 ounces per square yard (about 81 $g/m^2$)) which was treated with a dispersion of carbon black VULCAN XC-72R (available from Cabot Corp.) in a solution of a high molecular weight linear copolymer of epichlorohydrin and bisphenol A. The groundwall insulation was a tape having mica paper sandwiched between woven glass cloth on one side and a nonwoven polyester mat on the other side, the tape layers being bonded by a solventless epoxy resin that permeates through the tape layers and bonds them. The epoxy resin binder for the mica tape was that disclosed in U.S. patent application Ser. No. 08/413,015, assigned to the assignee of this invention, containing an epoxy resin, a metal acetylacetonate catalyst and an accelerator.

The bars were tested to failure, at which point cross-sections of the bars showed that the carbon filler was gone at the high stress corners of the bars. Based on the statistical distribution of the times-to-failure for this baseline group, a mathematical expression was developed to evaluate the performance of individual stator bars subsequently tested under identical conditions, but with an internal grading tape containing a conductive filler in accordance with this invention as specified in Example 9 to evaluate the effect of the filler on voltage endurance.

EXAMPLE 9 (INVENTION)

Two bars were made that were identical to the bars in Example 8, except that the conductive filler in the internal grading tape was 50.0% by weight (based on total solids of the treating varnish) of ZELEC ECP 1410-M instead of the carbon black used in Example 8. The groundwall insulation was identical to that used in Example 8. The voltage endurance life of each bar was 2.2 times the median life of the bars of Example 8, which is a significant improvement over the armature bars of Example 8.

The requirements of a molding compound for the transposition filler 18 of the type shown in the Figure include resin flow during pressing to fill in between the upper strands 12, followed by rapid gelation and cure during pressing in a heated press. The ability of a molding compound containing the conductive filler of this invention to fulfil these requirements was evaluated as described in Example 10.

EXAMPLE 10

A conductive molding compound was made from about 70.0 parts-by-weight of an epoxy novolac (DEN 438, available from the Dow Chemical Co.), about 30.0 parts-by-weight of a liquid bisphenol A diglycidyl ether epoxy resin (EPON 828, available from the Shell Chemical Co.), about 3.0 parts-by-weight of boron trifluoride-monoethyl amine catalyst, and about 84.3 parts-by-weight of ZELEC ECP 1410-M. The resulting conductive molding compound contained about 45.0% by weight (based on total solids) of ZELEC ECP 1410-M, gelled and cured quickly at temperatures of about 150° C. to 170° C. in a heated press, and had a surface resistance of approximately 25,000 ohms/square. These results evidenced the suitability of tin oxide-based compositions as conductive fillers for a molding compound used to form a transposition filler of an armature bar.

From the above examples, it can be seen that conductive tapes, adhesives, paints and molding compounds that contain tin oxide-based fillers in accordance with this invention and are used to form slot armorings, internal grading and transposition fillers for high voltage armature bars (i.e., Examples 2, 4, 5, 7, 9 and 10) exhibit superior manufacturability and voltage endurance performance as compared to the comparative examples (Examples 1, 3, 6 and 8) from the prior art. While the invention has been described in terms of preferred embodiments, it is apparent that other forms could be adopted by one skilled in the art. For example, while the examples discussed employed a particulate conductive filler of an antimony-doped tin oxide shell on a mica core, the invention encompasses conductive fillers composed entirely of antimony-doped tin oxide and antimony-doped tin oxide shells on other inert core materials, such as titanium oxide and silica. Accordingly, the scope of our invention is to be limited only by the following claims.

What is claimed is:

1. A high-voltage armature bar having:
   at least one tier of conductor strands; strand insulation surrounding each of the conductor strands;
   a conductive internal grading surrounding the tier of conductor strands, groundwall insulation surrounding the conductive internal grading; and
   a conductive material surrounding the groundwall insulation;
   characterized in that at least one of the conductive internal grading and the conductive material is formed to include at least one conductive material, the conductive material containing a conductive filler comprising antimony-doped tin oxide.

2. A high-voltage armature bar as recited in claim 1, wherein the conductive filler constitutes about 20% to about 60% by weight of total solids of the conductive material.

3. A high-voltage armature bar as recited in claim 1, wherein the conductive material is chosen from the group consisting of paints, tapes and adhesives.

4. A high-voltage armature bar as recited in claim 3, wherein the conductive filler constitutes about 20% to about 60% by weight of total solids of the conductive material.

5. A high-voltage armature bar as recited in claim 1, wherein the conductive filler consists of particles of tin oxide doped with about 5 to about 15 weight percent antimony.

6. A high-voltage armature bar as recited in claim 1, wherein the conductive filler comprises particles, each of the particles having an antimony-doped tin oxide shell over a core of a material chosen from the group consisting of mica, titanium oxide and silica, the antimony-doped tin oxide shell containing about 5 to about 15 weight percent antimony.

7. A high-voltage armature bar as recited in claim 1, wherein the conductive material contains the conductive filler in an amount sufficient to yield an electrical resistance of about 500 to about 100,000 ohms per square.

8. A high-voltage armature bar as recited in claim 1, wherein the conductive material further comprises a binder in which the conductive filler is dispersed.

9. A high-voltage armature bar as recited in claim 8, wherein the binder is chosen from the group consisting of epoxy resins, linear copolymers of epichlorohydrin and bisphenol A having a weight average molecular weight of at least 15,000, unsaturated polyester resins, alkyd resins, bismaleimide resins, polyimide resins, silicone resins, and cyanate ester resins.

10. A high-voltage armature bar as recited in claim 8, wherein the high-voltage armature further has a molding compound at opposite ends of the tier of conductor strands, characterized in that the molding compound contains the conductive filler.

11. A high-voltage armature bar having:
    at least two tiers of conductor strands, strand insulation surrounding each of the conductor strands;
    a strand separator between the two tiers of conductor strands;
    a molding compound at opposite ends of the two tiers of conductor strands;
    a conductive internal grading surrounding the tiers of conductor strands and the molding compound;
    groundwall insulation surrounding the conductive internal grading; and
    a conductive material surrounding the groundwall insulation;
    characterized in that at least one of the molding compound, the conductive internal grading and the conductive material is formed of a conductive material comprising a conductive filler dispersed in a binder, the conductive filler comprising antimony-doped tin oxide in an amount sufficient to yield an electrical resistance of about 500 to about 100,000 ohms per square for the conductive material.

12. A high-voltage armature bar as recited in claim 11, wherein the conductive filler consists of antimony-doped tin oxide particles having an antimony content of about 5 to about 15 weight percent and a particle size of about 0.1 to about 1.0 $\mu$m.

13. A high-voltage armature bar as recited in claim 11, wherein the conductive filler comprises particles, each of the particles having an antimony-doped tin oxide shell over a mica core, the antimony-doped tin oxide shell having an antimony content of about 5 to about 15 weight percent, the particles having a particle size of about 1 to about 10 $\mu$m.

14. A high-voltage armature bar as recited in claim 11, wherein the conductive filler comprises particles, each of the particles having a tin oxide shell over a titanium oxide core, the antimony-doped tin oxide shell having an antimony content of about 5 to about 15 weight percent, the particles having a particle size of about 1 to about 10 µm.

15. A high-voltage armature bar as recited in claim 11, wherein the conductive filler comprises particles, each of the particles having a tin oxide shell over a silica core, the antimony-doped tin oxide shell having an antimony content of about 5 to about 15 weight percent, the particles having a particle size of about 1 to about 10 µm.

16. A high-voltage armature bar as recited in claim 11, wherein the conductive material is a paint, adhesive or compound consisting essentially of the conductive filler and the binder, and wherein the conductive filler constitutes about 20% to about 60% by weight of total solids of the conductive material.

17. A high-voltage armature bar as recited in claim 11, wherein the binder is a compound, paint or adhesive chosen from the group consisting of epoxy resins, linear copolymers of epichlorohydrin and bisphenol A having a weight average molecular weight of at least 15,000, unsaturated polyester resins, alkyd resins, bismaleimide resins, polyimide resins, silicone resins, and cyanate ester resins.

18. A high-voltage armature bar as recited in claim 11, wherein the conductive material is a tape consisting essentially of the conductive filler and the binder dispersed in a fabric, and wherein the conductive filler constitutes about 20% to about 60% by weight of total solids of the conductive filler and the binder combined.

19. A high-voltage armature bar as recited in claim 11, wherein each of the molding compound, the conductive internal grading and the conductive material contains the conductive filler.

20. A high-voltage armature bar having:

at least two tiers of conductor strands;

strand insulation surrounding each of the conductor strands;

a strand separator between the two tiers of conductor strands;

a conductive molding compound at opposite ends of the two tiers of conductor strands;

a conductive internal grading surrounding the tiers of conductor strands and the molding compound, the conductive internal grading being chosen from the group consisting of conductive paints and conductive tapes impregnated with a conductive material;

groundwall insulation surrounding the conductive internal grading; and a conductive material surrounding the groundwall insulation, the conductive material comprising at least one material chosen from the group consisting of conductive paints, conductive tapes and conductive adhesives;

characterized in that the conductive molding compound, the conductive paints and the conductive tapes of the conductive internal grading, and the conductive paints, conductive tapes and conductive adhesives of the conductive material each contain a conductive particulate filler comprising tin oxide doped with about 5 to about 15 weight percent antimony.

\* \* \* \* \*